United States Patent
Uehara et al.

(10) Patent No.: US 7,968,241 B2
(45) Date of Patent: Jun. 28, 2011

(54) FUEL CELL SYSTEM AND METHOD OF CONTROLLING GAS PRESSURE IN FUEL CELL SYSTEM

(75) Inventors: Junji Uehara, Saitama (JP); Kenichiro Ueda, Saitama (JP); Daishi Igarashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 651 days.

(21) Appl. No.: 11/492,339

(22) Filed: Jul. 25, 2006

(65) Prior Publication Data

US 2007/0026280 A1 Feb. 1, 2007

(30) Foreign Application Priority Data

Jul. 28, 2005 (JP) ................. 2005-219220

(51) Int. Cl.
*H01M 8/04* (2006.01)
(52) U.S. Cl. ......... 429/443; 429/427; 429/428; 429/446
(58) Field of Classification Search .................... 429/13, 429/22, 25, 427, 428, 443, 446
See application file for complete search history.

(56) References Cited

U.S. PATENT DOCUMENTS

2004/0161643 A1 * 8/2004 Uehara et al. .................. 429/13

FOREIGN PATENT DOCUMENTS

| JP | 2002-313388 | 10/2002 |
| JP | 2003-168467 | 6/2003 |

OTHER PUBLICATIONS

Japanese Office Action for Application No. 2005-219220, dated Jan. 25, 2011.

* cited by examiner

*Primary Examiner* — Patrick Joseph Ryan
*Assistant Examiner* — Ben Lewis
(74) *Attorney, Agent, or Firm* — Nelson Mullins Riley & Scarborough LLP; Anthony A. Laurentano

(57) ABSTRACT

A controllable range of an air flow rate and an air pressure in a fuel cell system is calculated from air flow rates and air pressures when the air back pressure valve is fully open and fully closed. A target generation current is calculated from an accelerator position or an auxiliary unit to calculate a target air flow rate and a target air pressure as target values. If the target values are outside the controllable range, it is judged whether the target values exceed an upper limit the controllable range, the target values are decreased onto the upper limit, and if no, the target values are increased onto the lower limit of the controllable range.

13 Claims, 4 Drawing Sheets

FUEL CELL SYSTEM AND METHOD OF CONTROLLING GAS PRESSURE IN FUEL CELL SYSTEM

BACKGROUND OF THE INVENTION

1. Field of the Invention

The present invention relates to a fuel cell system capable of controlling a pressure of a gas in a fuel cell and a method of controlling the pressure of the gas in the fuel cell, and particularly to a fuel cell system with overpressure protection for a membrane in the fuel cell and a method of controlling the pressure of the gas in the fuel cell to protect overpressure in the membrane of the fuel cell.

2. Description of the Related Art

Fuel cell systems used in fuel cell electric vehicles (FCEV) include a plurality of single cells stacked, each cell being configured by sandwiching a solid polymer electrolyte membrane with an anode electrode and a cathode electrode in which hydrogen is supplied from a hydrogen tank to the anode electrode as fuel, and air is supplied to the cathode electrode through an air compressor. In an exhaust side of the cathode electrode is provided an air back pressure valve (air pressure valve). A pressure of the air supplied in the cathode electrode is controlled toward a target pressure by controlling a rotational speed of the air compressor and a valve position of the air back pressure valve.

This type of fuel cell system is disclosed, for example, in Japanese laid-open patent application publication No. 2003-168467 at paragraphs from 0026 to 0029, and FIG. 1.

SUMMARY OF THE INVENTION

A first aspect of the present invention provides a fuel cell system comprising: a fuel cell that generates an electric power by reaction of a reaction gas; a flow rate detector that detects a flow rate of the reaction gas supplied to the fuel cell; a pressure detector that detects a pressure of the reaction gas supplied to the fuel cell; a flow rate control unit that controls the flow rate of the reaction gas; a pressure control unit that controls the pressure of the reaction gas; and a pressure control range calculating unit that calculates a controllable range of the pressure control unit on the basis of at least one of the detected flow rate and pressure, wherein the flow rate control unit controls the flow rate on the basis of the calculated pressure controllable range.

According to the present invention, the controllable range can be changed in accordance with a change in a pressure loss. The flow rate can be controlled in accordance with the changed controllable range to control the pressure of the reaction gas to a target pressure. Further, continuously controlling the pressure toward the target pressure can prevent an excess pressure in the fuel cell, so that, for example, disadvantages such as accelerated deterioration of the membrane in the fuel cell can be prevented.

Preferably, the controllable range is calculated on the basis of the detected flow rates when the pressure control unit is fully open and fully closed, respectively, and the detected pressures when the pressure control unit is fully open and fully closed, respectively.

Calculation on the basis of both the air flow rate and the air pressure can provide detection of the pressure loss in a status near an actual status, so that the controllable range can be calculated more accurately.

An output transition status detection unit may be further provided to detect whether an output of the fuel cell is in an output transition status, wherein the pressure control range calculating unit does not use the flow rates and the pressures for calculating the controllable range when the output of the fuel cell is in the output transition status.

Because the flow rates and the pressures when the pressure control unit is fully open and fully closed in the output transition status may largely deviate from the controllable range, it is preferable that they are not used for calculating the controllable range. The output transition status means that, for example, if the fuel cells is mounted on a vehicle, the output is rapidly increased in response to stepping on the accelerator for a rapid acceleration, in which the air flow rate and the air pressure temporarily and largely increase. Inversely, it means that the air flow rate and the air pressure temporarily and largely decrease.

In such an output transition status, signals of the flow rate and the pressure may largely deviate from the normal values and thus become noise. Removing these signals provides an accurate calculation of the accurate controllable range.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Prior to describing an embodiment, will be argued the prior art disclosed in Japanese laid-open patent application publication No. 2003-168467. In this fuel cell system, because water is generated, in a side of the cathode electrode, by an electrochemical reaction of hydrogen with oxygen in air, clogging may occur within a space of the cathode or in tubes connected to the space of the cathode. Accordingly there is a problem that an air pressure cannot be accurately controlled toward a target.

Figure 5:
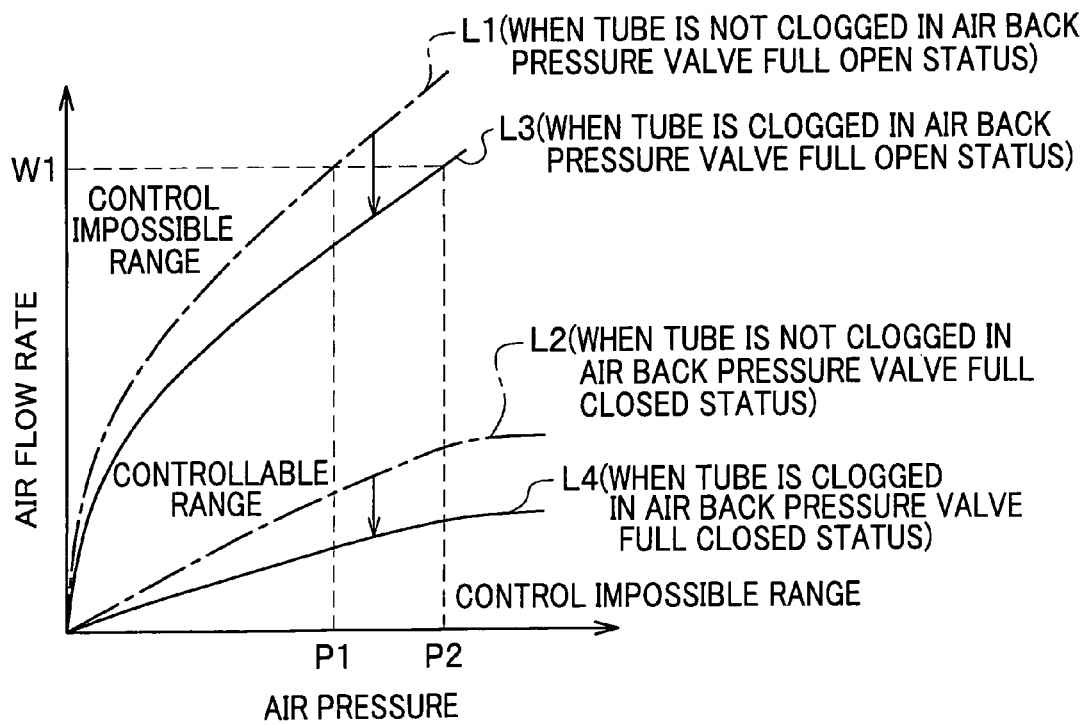
FIG. 5 shows a variation of the controllable range according to the present invention.

With reference to FIG. 5. will be further argued this problem. The inventor prepared FIG. 5 for the present invention to show a relation between the air pressure and a flow rate of the air in presence and absence of clogging in a tube to show a controllable range in a fuel cell system including an air compressor for supplying air to a cathode electrode of a fuel cell and an air back pressure valve at an exhaust side of the fuel cell.

In FIG. 5, dashed curves L1 and L2 represent, in the absence of clogging, control curves in statuses that the air back pressure valve is fully open and fully closed, respectively. The solid curves L3 and L4 represent, in the presence of clogging, control curves in statuses that the air back pressure valve is fully open and fully closed, respectively. The range between the dashed curves L1 and L2 and the range between the solid curves L3 and L4 are controllable ranges, and thus ranges outside the controllable ranges are control impossible ranges.

For example, as shown by the dashed curve L1, the air flow rate is controlled toward W1 to make the air pressure become a target pressure P1 in the absence of clogging in the tube when the air back pressure valve is fully open.

However, if a pressure loss increases due to the clogging in the tube in the status that the air back pressure valve is fully open, an upper limit of the controllable range shifts down to a solid curve L3. Thus, if the air flow rate is controlled at the same air flow rate W1, the air pressure becomes a pressure P2 higher than the target pressure P1. Thus, if increase in the pressure loss is neglected, the air pressure will be controlled toward an air pressure excessively higher than the target pressure, with an increase in the air pressure difference between the anode and cathode electrodes of the fuel cell, which may decrease durability of the fuel cell, more specifically, which may accelerate deterioration in or cause a damage to, for example, the electrolyte membrane.

The inventor intended to provide a fuel cell system capable of accurately controlling the air pressure toward the target pressure without decrease in the durability of the fuel cell.

Hereinafter with reference to FIGS. 1 to 4 will be described a fuel cell system according to an embodiment of the present invention.

Figure 1:
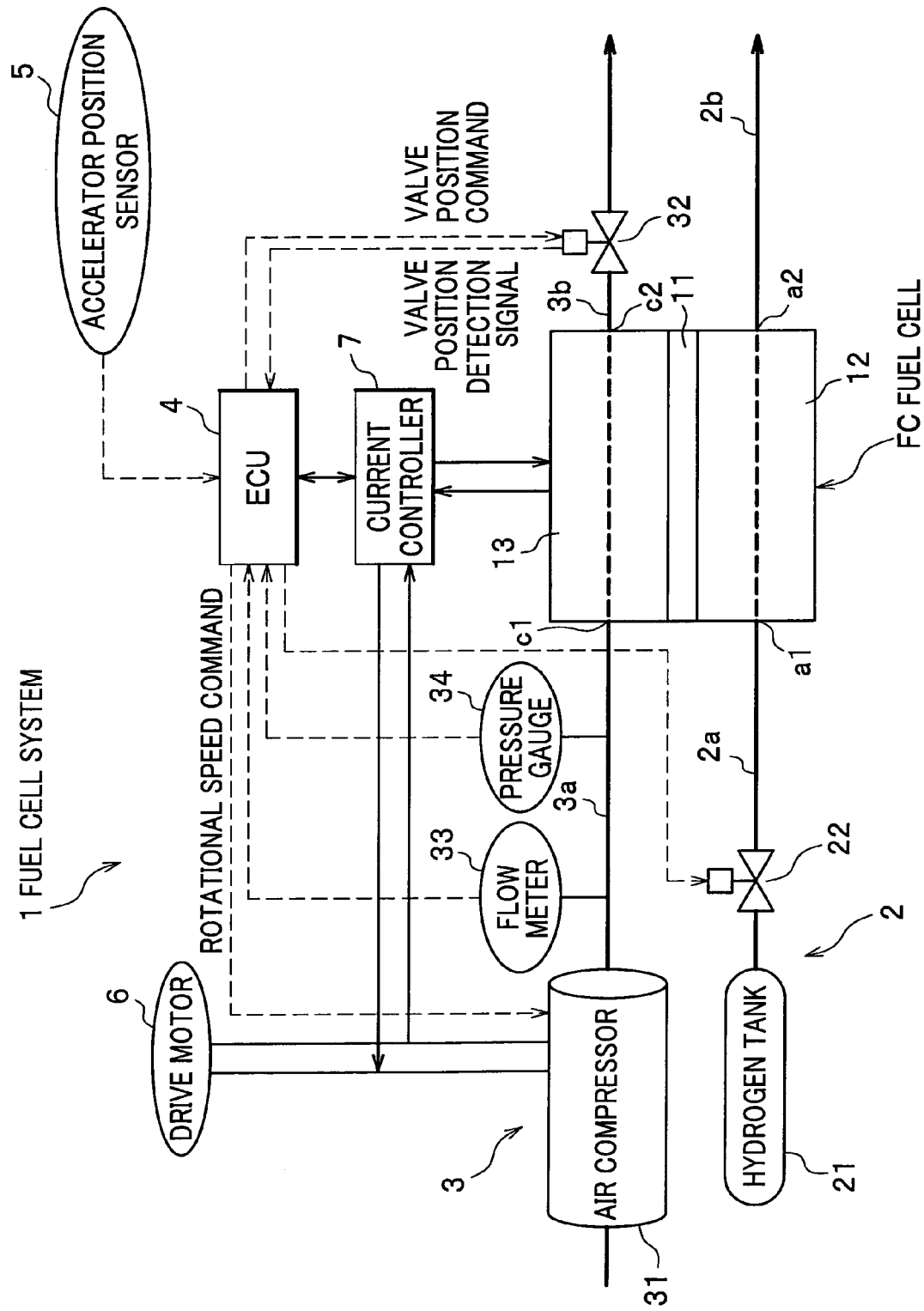
FIG. 1 is a block diagram of a fuel cell system according to an embodiment of the present invention.
Figure 2:
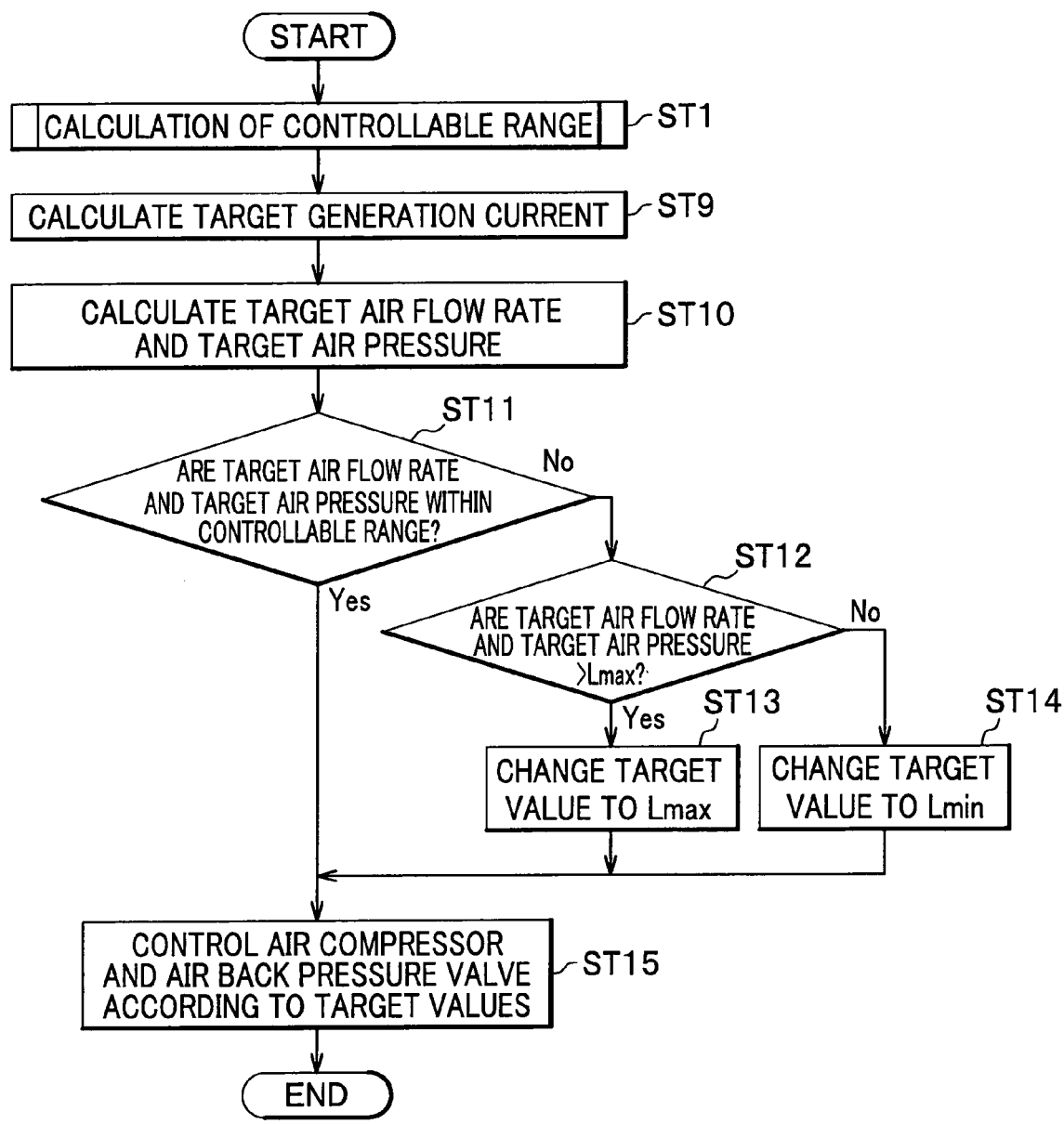
FIG. 2 depicts a flow chart of a main routine showing a pressure control according to the embodiment.
Figure 3:
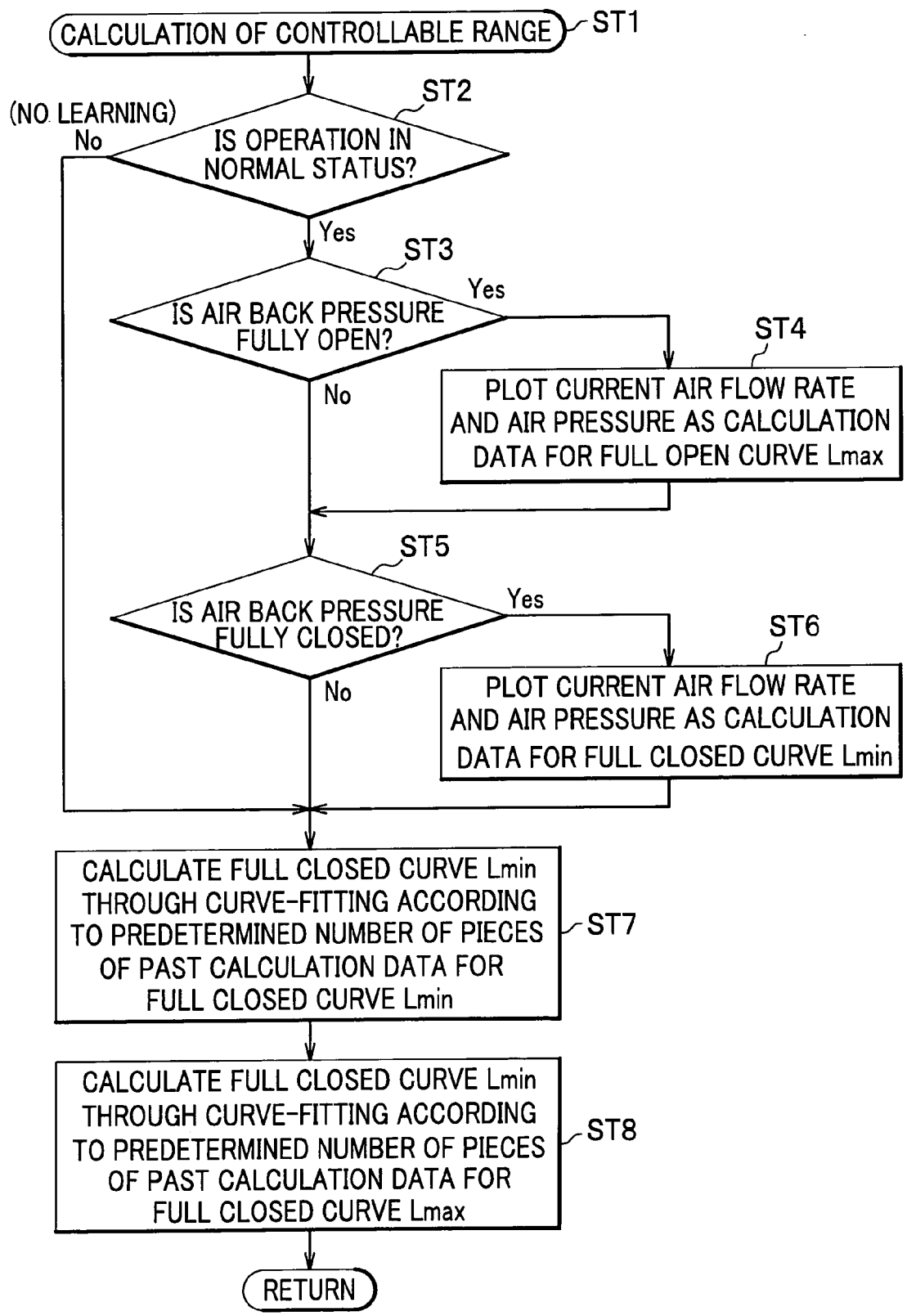
FIG. 3 depicts a flow chart of a subroutine shown in the main routine in FIG. 2.
Figure 4:
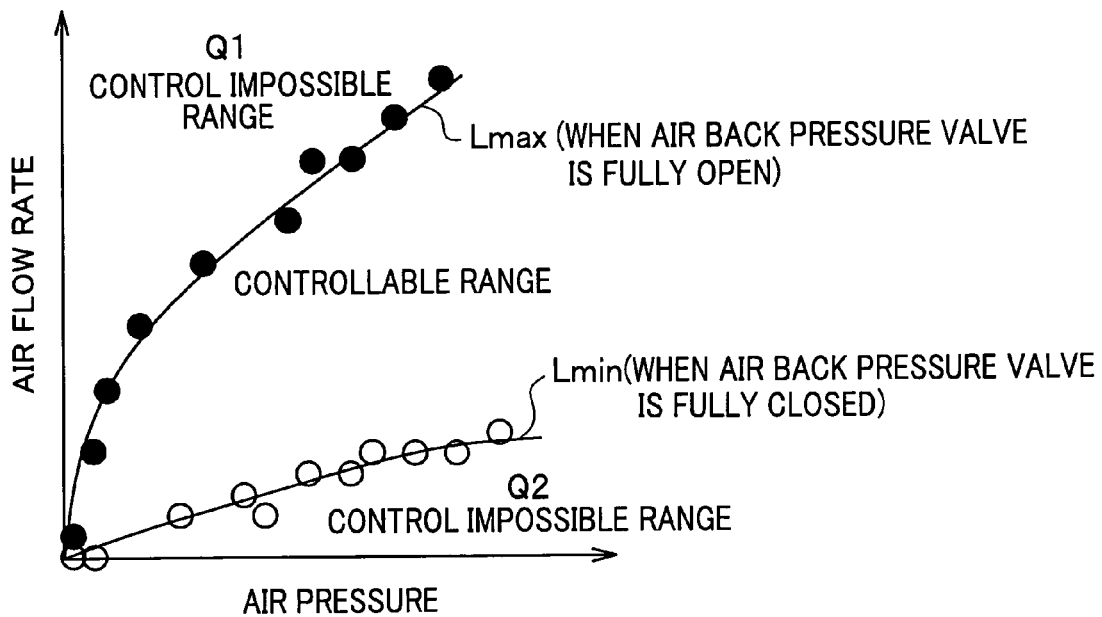
FIG. 4 shows a controllable range in the embodiment.

FIG. 1 is a block diagram of the fuel cell system according to an embodiment of the present invention. FIG. 2 depicts a flow chart of a main routine showing a pressure control in the fuel cell system, and FIG. 3 depicts a flow chart of a subroutine shown in the main routine in FIG. 2. FIG. 4 is a graphical drawing showing a controllable range according to the embodiment.

Hereinafter, a vehicle is exampled to describe the present invention. However, the present invention is not limited to this, but applicable to ships, aircraft, and fixed type apparatuses for home use and industrial use.

As shown in FIG. 1, the fuel cell system 1 includes a fuel cell FC, an anode system 2, a cathode system 3, and an ECU 4.

The fuel cell FC comprises a plurality of single cells stacked, each cell including a membrane electrode structure provided by sandwiching a solid polymer electrolyte membrane 11 with an anode electrode 12 and a cathode electrode 13 in which each single cell is sandwiched with a pair of electrical conductive separators (not shown) for stacking.

FIG. 1 shows, for sake of simplicity, only a flow passage for allowing hydrogen as fuel to flow therethrough in a side of the anode electrode 12 and a flow passage for allowing the air (reaction gas) as an oxidizing agent to flow therethrough in a side of the cathode electrode 13. However, flow passages (not shown) of a coolant for the fuel cell are further provided in the anode electrode 12 and the cathode electrode 13 in the separators without mixing up with the fuel and the oxidizing agent.

In the fuel cell FC, hydrogen ions are generated by a reaction of a catalyst in the side of the anode electrode 12, moving to a side of the cathode electrode 13 through the solid polymer electrolytic membrane 11, electrochemically react with oxygen by a reaction of the catalyst in the side of the cathode electrode 13.

The anode system 2 supplies hydrogen to the anode electrode 12 of the fuel cell FC as well as exhausts the hydrogen from the anode electrode 12 and thus comprises an anode gas supply tube 2a, an anode gas exhausting tube 2b, and a hydrogen tank 21 with a shutdown valve 22.

The anode gas supply tube 2a is at its one end connected to a hydrogen inlet a1 of the anode electrode 12 of the fuel cell FC. The anode gas exhaust tube 2b is at its one end connected to a hydrogen outlet a2 of the anode electrode 12. The hydrogen tank 21 is connected to the other end of the anode gas supply tube 2a via the shutdown valve 22 and filled with hydrogen having an extremely high purity at an extremely high pressure of, for example, 35 MPa (350 atmospheres).

In addition, although not shown in FIG. 1, the anode system 2 comprises a pressure regulation valve for reducing the high pressure of hydrogen to a predetermined pressure, an ejector for recycling the hydrogen not reacted, exhausted from the fuel cell FC to an inlet side of the fuel cell FC, and a purge valve for exhausting impurity when a power generating capacity decreases because the impurity such as nitrogen accumulated within the anode system 2.

The cathode system 3 supplies the air to the cathode electrode 13 of the fuel cell FC and exhausts the air from the cathode electrode 13, and thus comprises a cathode gas supply tube 3a, a cathode gas exhausting tube 3b, an air compressor 31, an air back pressure valve 32, a flow meter 33, and a pressure gauge 34.

The cathode gas supply tube 3a is at its one end connected to the air inlet c1 of the cathode 13. The cathode gas exhausting tube 3b is at its one end connected to the air outlet c2 of the cathode electrode 13.

The air compressor 31 may be a supercharger driven by a motor (not shown) to take the air therein from the external of the vehicle to provide adiabatic compression to supply the air to the cathode electrode 13 of the fuel cell FC.

The air back pressure valve 32 provided in the cathode gas exhausting tube 3b downstream from the fuel cell FC is, for example, of a butterfly type which allows a valve position to be controlled. The air back pressure valve 32 has such a configuration that its flow passage cannot be totally closed even if the valve position is controlled to a totally closed position.

The flow meter 33 provided in the cathode gas supply tube 3a upstream from the fuel cell FC is a sensor for detecting a flow rate of the air from the air compressor 31.

The pressure gauge 34 provided in the cathode gas supply tube 3a upstream from the fuel cell FC is a sensor for detecting the supplied air in the side of the cathode electrode 13 of the fuel cell FC.

Although not shown in FIG. 1, in the cathode system 3, the cathode gas supply tube 3a is provided with a cooler for cooling the adiabatic-compressed air from the air compressor 31, a humidifier for humidifying the cooled air, and the like. The humidifier humidifies the air supplied from the air compressor 31 with an off-gas (air and generated water) exhausted from the cathode electrode 13 of the fuel cell FC.

The ECU 4 comprises a CPU (Central Processing Unit) (not shown), a memory (not shown), an input/output interface (not shown), various types of electric and electronic circuits (not shown) and is electrically connected to the shutdown valve 22, the air compressor 31, the air back pressure valve 32, the flow meter 33, the pressure gauge 34, an accelerator position sensor 5 disposed to an accelerator (accelerator pedal), and a drive motor 6. The ECU 4 thus configured generates signals for controlling opening and closing operations of the shutdown valve 22, a rotational speed of the air compressor 31, a valve position command of the air back pressure valve 32, as well as receives an air flow rate detection value detected by the flow meter 33, a pressure detection value detected by the pressure gauge 34, an accelerator position (acceleration degree) detected by the accelerator position sensor 5, and a value of a current required by loads such as the drive motor 6 and the air compressor 31. A current controller 7 comprises a DC-DC chopper to control a current generated by the fuel cell FC on the basis of a target generation current, i.e., a generation command supplied from the ECU 4 to supply a power to the loads such as the air compressor 31 and the drive motor 6. The current controller 7 is connected to a storage unit (not shown) including, for example, a battery (not shown) and a capacitor (not shown) to electrically charge the storage unit as needed and discharge the storage unit to supply the power to the air compressor 31, the drive motor 6, and the like.

With reference to FIGS. 2 and 3 will be described operation of the fuel system 1 of the embodiment.

A process shown in FIGS. 2 and 3 is always (periodically) executed during running of the fuel cell system 1.

The ECU 4 calculates a controllable range, as shown in a step (subroutine) ST1 in FIG. 2. FIG. 3 shows the subroutine ST1 for calculating the controllable range. In a step ST2, first the ECU 4 judges whether operation is in a normal status. Here, the normal status means that variations in the air flow and the air pressure are small and is distinguishable from the status in which the variations are large because the air flow and the air pressure temporarily increases, for example, when the vehicle is rapidly accelerated (hereinafter, this status is referred to as an output transition period (status)). The output transition period is judged on the basis of the signals supplied to the ECU 4 from the accelerator position sensor 5, the air compressor 31, the drive motor 6, and the like. For example, the output transition period is judged when the accelerator position detected by the accelerator position sensor 5 is temporarily increased as well as a large power is temporarily, suddenly requested by the air compressor 31 and the drive motor 6.

When judging that the operation is in the normal status (Yes, in the step ST2), the ECU 4 judges, in a step ST3, whether the air back pressure valve 32 is fully open. When judging that the air back pressure valve 32 is fully open (Yes, in the step ST3), the ECU 4 acquires, in a step ST4, as data necessary for calculating a full open curve Lmax a current air flow rate (an amount of supplied air) from the flow meter 33 and a current air pressure (supplied pressure) from the pressure gauge 34, respectively, to accumulate pieces of data of the relation between the current air flow rate and the current air pressure in the memory to plot a plurality of pieces of data to provide the full open curve Lmax. When judging that the air back pressure valve 32 is not fully open (No, in the step ST3), the ECU 4 moves to a step ST5 without executing the process in the step ST4. More specifically, if the air back pressure valve 32 is not fully open, the data is not required to be stored because the data is not necessary to calculate the controllable range. The judging whether the air back pressure valve 32 is fully open is made on the basis of a valve position detection signal (see FIG. 1) supplied from the air back pressure valve 32.

In the following step ST5, the ECU 4 judges whether the air back pressure valve 32 is fully closed. When the air back pressure valve 32 is fully closed (Yes, in the step ST5), the ECU 4 acquires, in a step ST6, as data necessary for calculating a full closed curve Lmin, the current air flow rate (the amount of supplied air) from the flow meter 33 and the current air pressure (supplied pressure) from the pressure gauge 34, respectively, to accumulate pieces of data of the relation between the current air flow rate and the current air pressure in the memory to plot a plurality of pieces of data to provide the full closed curve Lmin. The judgment whether the air back pressure valve 32 is fully open is made on the basis of the valve position detection signal (see FIG. 1) supplied from the air back pressure valve 32.

The ECU 4 calculates the full closed curve Lmin through curve-fitting on the basis of a predetermined number of pieces of the data necessary for calculating the full closed curve Lmin which have been accumulated and plotted. In the following step ST8, the ECU 4 calculates, as calculated in the step ST7, the full open curve Lmax through the curve-fitting on the basis of a predetermined number of pieces of the data necessary for calculating the full open curve Lmax which have been accumulated and plotted. The calculation of the full closed curve Lmin in the step ST7 and the full open curve Lmax in the step ST8 is not limited to the curve-fitting. For example, the full closed curve Lmin and the full open curve Lmax may be calculated on the basis of a coefficient of pressure loss obtained from the acquired data using a theoretical formula for the pressure loss.

On the other hand, when judging that the operation is not in the normal status, i.e., judging that the operation is in the output transition period (No, in the step ST2), the ECU 4 executes the processes in the steps ST7 and ST8 without learning, i.e., without accumulating and plotting the data of the relation between the air flow rate and the air pressure. In other words, the previous full closed curve Lmin and the previous full open curve Lmax are maintained.

The ECU 4 returns to the main routine in FIG. 2 and calculates a target generation current in a step ST9. The target generation current is calculated on the basis of the accelerator position supplied from the accelerator position sensor 5 and electric powers requested by loads such as the air compressor 31 and the drive motor 6. The ECU 4 calculates, in a step ST10, a target air flow rate and a target air pressure on the basis of the target generation current calculated in the step ST9. The ECU 4 judges whether the calculated target air flow rate and target air pressure are within the controllable range, i.e., judges whether the calculated target air flow rate and the target air pressure are within the controllable range between the full open curve Lmax and the full closed curve Lmin in a step ST11. When judging that the target air flow rate and the target air pressure are within the controllable range (Yes, in a step ST11), the ECU 4 controls, in a step ST15, the air compressor 31 at a rotational speed corresponding to the target value (target air flow rate) and controls the air back pressure valve 32 at a valve position corresponding to the target value (target air pressure), without any compensation. Thus, the target generation current is supplied as the generation command to the current controller 7 which distributes a generated current to the air compressor 31 and the drive motor 6, and the like, as needed.

In addition, when judging that the target air flow rate and the target air pressure are not within the controllable range (No, in the step ST11), the ECU 4 judges, in a step ST12, whether the target air flow rate and the target air pressure are greater than the full open curve Lmax. In other words, the ECU 4 judges whether the target air flow rate and the target air pressure are within a control impossible range Q1 shown in FIG. 4. When judging that the target air flow rate and the target air pressure are within the control impossible range Q1 (Yes, in the step ST12), the ECU 4 changes, in a step ST13, target values (the target air flow rate and the target air pressure) to values on the full open curve Lmax previously calculated or values within the controllable range. When judging that the target values (the target air flow rate and the target air pressure) are within the control impossible range Q2 (No, in the step ST12), the ECU 4 changes, in a step ST14, target values (the target air flow rate and the target air pressure) to values on the full closed curve Lmin previously calculated or within the controllable range. In the step ST15, the ECU 4 controls the air compressor 31 at a rotational speed corresponding to the target value (target air flow rate) and the air back pressure valve 32 at a valve position corresponding to the target value (target air pressure). Here, a case that the target values are changed to the full closed curve Lmin occurs, for example, when the full closed curve Lmin shifts upon increase in the pressure loss due to clogging in tube and the like and after that, the pressure loss decreases, so that the full closed curve Lmin returns to the original full closed curve (see the dashed curve L2 in FIG. 5).

As described above, the controllable range can be changed in a real time manner from the relations between the air flow rates and the air pressures when the air back pressure valve 32 is fully open and fully closed. Thus, even though the pressure loss increases or decreases because the passage in the side of the cathode electrode 13 or the cathode gas exhaust tube 3b are clogged, the air flow is suitably controlled. Further, in the process in the step ST2, data detected for the output transition period is excluded for determining the controllable range, which makes the control on the basis of the controllable range more accurate.

As mentioned above, the air flow is suitably controlled to suitably control the air pressure to the target pressure, preventing a pressure difference between the anode electrode 12 and the cathode electrode 13 from increasing, i.e., preventing an inner pressure of the cathode electrode 13 from being excessively higher than the inner pressure of the anode electrode 12, or inversely preventing the inner pressure of the anode electrode 12 from excessively higher than the inner pressure of the cathode electrode 13. This prevents such deterioration in the fuel cell FC that the deterioration of the solid polymer electrolyte membrane 11 is accelerated or the solid polymer electrolyte membrane 11 is damaged. In addition, the mileage can be improved by reduction in the energy consumption in the air compressor 31 or the like.

In the above-mentioned embodiment, the pressure controllable range is determined on the basis of both the detected flow rate and the detected pressure. However, the pressure controllable range may be determined on the basis of either of the detected flow rate or the detected pressure.

Furthermore, the above embodiment has been described with an example in which the present invention is applied to the cathode electrode 13. However, the present invention is applicable to the side of the anode electrode 12.

In addition, the controllable range is calculated on the basis of both the amount of the supplied air and the supplied air pressure. However, it can be calculated on the basis of only the air flow rate or only the air pressure.

According to this configuration, the pressure of the air supplied to the fuel cell can be accurately controlled toward the target pressure without decrease in durability even though the pressure loss due to, for example, clogging in the tubes changes.

As mentioned above, it is detected whether an output of the fuel cell is in the output transition status. The air flow rates and the supply air pressures are not used for calculating the controllable range when the fuel cell is in the output transition status. Further the output transition status may be judged when a difference in a required current of the fuel cell for a unit interval is greater than a predetermined value. The output transition status may be judged when a difference in the accelerator position for the unit interval is greater than a predetermined value. Further, the output transition status may be judged when a difference in the accelerator position for the unit interval is greater than a predetermined value. Further, the output transition status is judged when a difference between current target and current actual values regarding the output of the fuel cell is greater than a predetermined value. Further, the fuel cell system has a step of compensating a target value for at least one of the flow rate and the pressure in accordance with the controllable range when the flow rate and the pressure are outside the controllable range.

As mentioned above, the ECU 4 controls the air compressor 31 at the rotational speed corresponding to the target flow rate. Strictly, the flow rate is influenced by the valve position of the air back pressure valve 32. Thus, an air flow control unit is provided with a combination of the air compressor 31 and the air back pressure valve 32. However, the air flow rate is almost all controlled by the air compressor 31. Thus, the air flow control unit is substantially provided by the air compressor 31. Further, a control amount for the air compressor 31 may be compensated by the control amount of the air back pressure valve 32 using, for example, a table.

On the other hand, the ECU 4 controls the air back pressure valve 32 at the target valve position corresponding to the target pressure. The pressure is also influenced by the rotational speed of the air compressor 31. However, the air pressure is controlled by the air back pressure valve 32 rather than the air compressor 31. Thus, the air pressure is substantially controlled by the air back pressure valve 32, and a control amount for the air back pressure valve 32 may be compensated by the control amount of the air compressor 31 using, for example, a table.

In addition, FIGS. 4 and 5 show the controllable range in a status which is substantially static regarding power generation (output static status). In the output transition status, the air flow rate and the air pressure may go outside the controllable range as mentioned above. This is because, for example, when the air flow rate is rapidly increased, the air flow rate increases with a delay because the rotational speed of the air compressor 31 increases with the delay. This may make the air flow rate and the air pressure go outside the control range.

The invention claimed is:

1. A fuel cell system comprising:
   a fuel cell that generates an electric power by a reaction of a reaction gas;
   a flow rate detector provided on a passage connecting a reaction gas source to the fuel cell, wherein the flow rate detector detects a flow rate of the reaction gas supplied to the fuel cell;
   a pressure detector provided on the passage connecting the reaction gas source to the fuel cell, wherein the pressure detector detects a pressure of the reaction gas supplied to the fuel cell;
   a flow rate control unit programmed to control the flow rate of the reaction gas;
   a pressure control unit programmed to control the pressure of the reaction gas; and
   a pressure control range calculating unit programmed to continuously calculate a controllable range of the pressure control unit on the basis of at least one of the detected flow rate and the detected pressure without using preset values when the fuel cell system operates in a normal status,
   an output transition status detection unit programmed to detect whether the fuel cell is in an output transition status, wherein:
   the flow rate control unit is programmed to control the flow rate on the basis of the calculated pressure controllable range,
   the flow rate detector and the pressure detector are coupled to the pressure control range calculating unit,
   the pressure control range calculating unit is programmed to continuously calculate the controllable range on the basis of the detected flow rates and the detected pressures without using preset values by calculating a range of maximum values when the pressure control unit is fully open and by calculating a range of minimum values when the pressure control unit is fully closed, the pressure control range calculating unit is further programmed to omit the detected flow rates and the detected pressures when the fuel cell is in the output transition status from calculating the controllable range, and the fuel cell is controlled using the calculated controllable range.

2. The fuel cell system as claimed in claim 1, wherein the output transition status is judged when a difference in a required current of the fuel cell for a unit interval is greater than a predetermined value.

3. The fuel cell system as claimed in claim 1, wherein the output transition status is judged when a difference in an accelerator position for the unit interval is greater than a predetermined value.

4. The fuel cell system as claimed in claim 1, wherein the output transition status is judged when a difference between a current target value and a current actual value regarding the output of the fuel cell is greater than a predetermined value.

5. The fuel cell system as claimed in claim 1, further comprising a compensating unit that compensates a target value for at least one of the flow rate and the pressure in accordance with the controllable range when the detected flow rate and the detected pressure are outside the controllable range.

6. A method of controlling a fuel cell system comprising the steps of:

generating an electric power by a reaction of a reaction gas;

detecting a flow rate of the reaction gas supplied to the fuel cell;

detecting a pressure of the reaction gas supplied to the fuel cell;

controlling the flow rate of the reaction gas;

controlling the pressure of the reaction gas;

continuously calculating a controllable range of the pressure on the basis of at least one of the detected flow rate and the detected pressure without using preset values by calculating a range of maximum values when the pressure control unit is fully open and by calculating a range of minimum values when the pressure control unit is fully closed while the fuel cell system operates in normal status, wherein the flow rate is controlled on the basis of the calculated pressure controllable range; and controlling the fuel cell using the calculated controllable range.

7. The method as claimed in claim 6, wherein the controllable range is calculated on the basis of the detected flow rates when the pressure control unit is fully open and fully closed, respectively, and the detected pressures when the pressure control unit is fully open and fully closed, respectively.

8. The method as claimed in claim 7, further comprising the step of detecting whether the fuel cell is in an output transition status, wherein the detected flow rates and the detected pressures are not used for calculating the controllable range when the fuel cell is in the output transition status.

9. The method as claimed in claim 8, wherein the output transition status is judged when a difference in a required current of the fuel cell for a unit interval is greater than a predetermined value.

10. The method as claimed in claim 8, wherein the output transition status is judged when a difference in an accelerator position for the unit interval is greater than a predetermined value.

11. The method as claimed in claim 8, wherein the output transition status is judged when a difference between a current target value and a current actual value regarding the output of the fuel cell is greater than a predetermined value.

12. The method as claimed in claim 6, further comprising the step of compensating a target value for at least one of the flow rate and the pressure in accordance with the controllable range when the detected flow rate and the detected pressure are outside the controllable range.

13. A fuel cell system comprising:

a fuel cell that generates an electric power by a reaction of a reaction gas;

a flow rate detector that detects a flow rate of the reaction gas supplied to the fuel cell;

a pressure detector that detects a pressure of the reaction gas supplied to the fuel cell;

a flow rate control unit programmed to control the flow rate of the reaction gas;

a pressure control unit programmed to control the pressure of the reaction gas; and a pressure control range calculating unit programmed to continuously calculate a controllable range of the pressure control unit on the basis of the detected flow rate and the detected pressure without using preset values when the pressure control unit is fully open and by calculating a range of minimum values when the pressure control unit is fully closed while the fuel cell system is running to change the controllable range in real-time in a normal status, wherein the flow rate control unit controls the flow rate on the basis of the calculated pressure controllable range, and the fuel cell is controlled using the calculated controllable range.

* * * * *